US009946029B2

United States Patent
Shi et al.

(10) Patent No.: US 9,946,029 B2
(45) Date of Patent: Apr. 17, 2018

(54) OPTICAL COUPLER HAVING ANCHORED CANTILEVER STRUCTURE WITH MULTI-STAGE INVERSE TAPER CORE WAVEGUIDE AND FABRICATION METHOD THEREOF

(71) Applicant: SiFotonics Technologies Co., Ltd., Grand Cayman (KY)

(72) Inventors: Tuo Shi, Beijing (CN); Tzung-I Su, Zhongli (TW); Changhua Chen, Beijing (CN); Yongbo Shao, Beijing (CN); Dong Pan, Andover, MA (US)

(73) Assignee: SiFotonics Technologies Co, Ltd., Grand Cayman (KY)

( * ) Notice: Subject to any disclaimer, the term of this patent is extended or adjusted under 35 U.S.C. 154(b) by 0 days.

(21) Appl. No.: 14/818,715

(22) Filed: Aug. 5, 2015

(65) Prior Publication Data

US 2016/0041340 A1 Feb. 11, 2016

Related U.S. Application Data

(60) Provisional application No. 61/999,741, filed on Aug. 5, 2014.

(51) Int. Cl.
| | |
|---|---|
| *G02B 6/12* | (2006.01) |
| *G02B 6/26* | (2006.01) |
| *G02B 6/28* | (2006.01) |
| *G02B 6/42* | (2006.01) |
| *G02B 6/10* | (2006.01) |
| *G02B 6/30* | (2006.01) |

(Continued)

(52) U.S. Cl.
CPC ............ *G02B 6/305* (2013.01); *G02B 6/1228* (2013.01); *G02B 6/136* (2013.01); *G02B 2006/12061* (2013.01)

(58) Field of Classification Search
CPC ........ G02B 2006/12061; G02B 6/1228; G02B 6/136; G02B 6/4257; G02B 2006/12097; G02B 6/132; G02B 6/305; G02B 2006/12038; G02B 2006/12176; G02B 2006/12195; G02B 6/3502
USPC ........ 385/14, 30, 43, 50, 129–131, 142, 144
See application file for complete search history.

(56) References Cited

U.S. PATENT DOCUMENTS 5,682,401 A * 10/1997 Joannopoulos ........ B82Y 20/00
372/92
8,326,100 B2 12/2012 Chen et al.
(Continued)

*Primary Examiner* — Kaveh C Kianni
*Assistant Examiner* — Hung Lam
(74) *Attorney, Agent, or Firm* — Han IP Corporation; Andy M. Han

(57) ABSTRACT

An optical coupler structure may include a substrate, a waveguide section and an anchored cantilever section. The substrate may include a main body and a sub-pillar structure formed on the main body. The waveguide section may be disposed on the substrate, and may include a core waveguide of a first material surrounded by a cladding layer of a second material. The anchored cantilever section may be disposed on the sub-pillar structure on the substrate, which may be configured to support the cantilever section and separate the cantilever section from the main body of the substrate. The anchored cantilever section may include a multi-stage inverse taper core waveguide and a cladding layer, of the second material, which surrounds the multi-stage inverse taper core waveguide.

28 Claims, 14 Drawing Sheets

(51) Int. Cl.
*G02B 6/122* (2006.01)
*G02B 6/136* (2006.01)

(56) References Cited

U.S. PATENT DOCUMENTS

| | | | |
|---|---|---|---|
| 9,217,836 B2* | 12/2015 | Asghari | G02B 6/423 |
| 2011/0222184 A1* | 9/2011 | Komura | B82Y 20/00 |
| | | | 360/59 |
| 2012/0076465 A1* | 3/2012 | Chen | G02B 6/14 |
| | | | 385/124 |
| 2012/0328243 A1* | 12/2012 | Fang | G02B 6/1228 |
| | | | 385/50 |

* cited by examiner

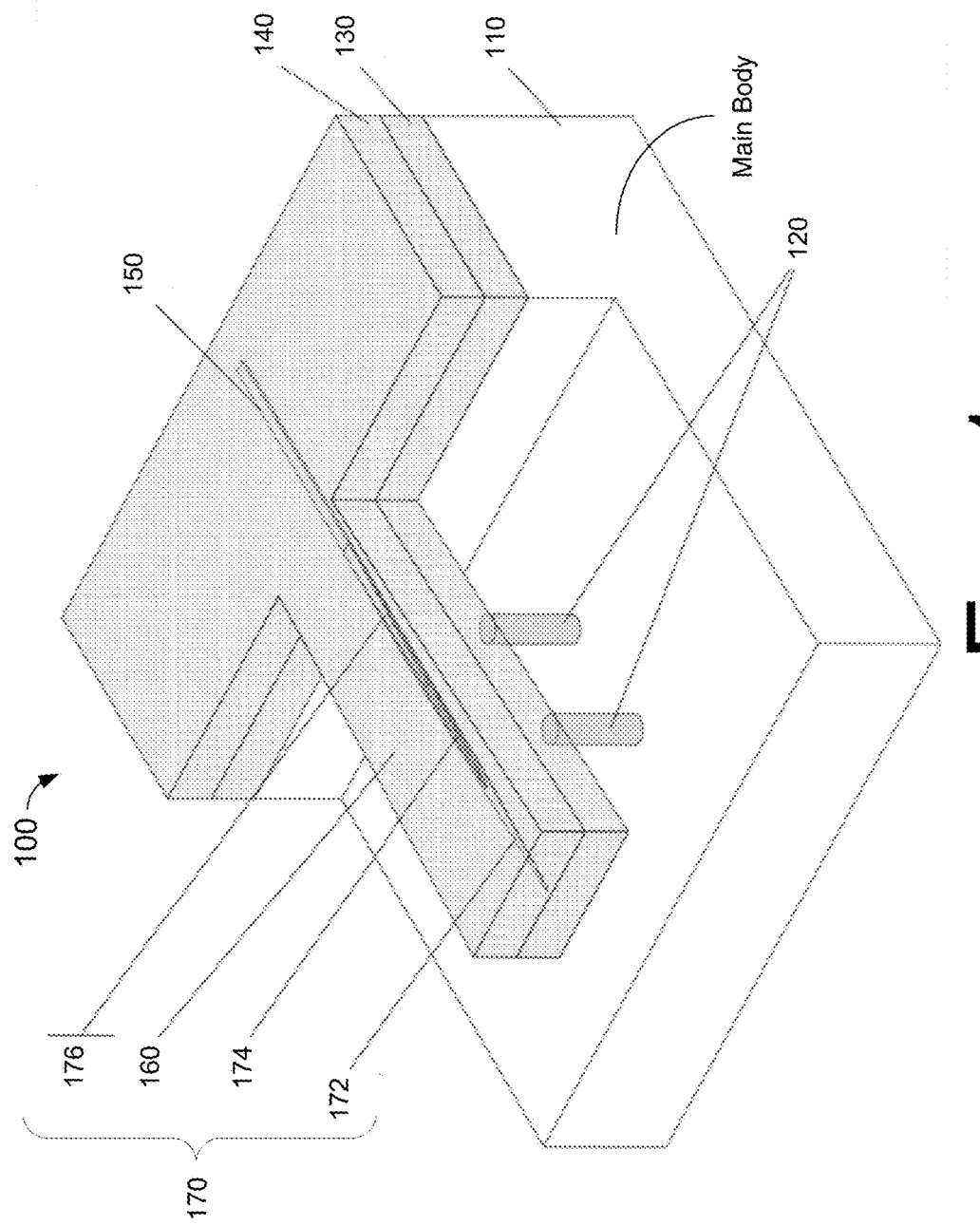

OPTICAL COUPLER HAVING ANCHORED CANTILEVER STRUCTURE WITH MULTI-STAGE INVERSE TAPER CORE WAVEGUIDE AND FABRICATION METHOD THEREOF

CROSS-REFERENCE TO RELATED PATENT APPLICATION(S)

The present disclosure is a non-provisional application of, and claims the priority benefit of, U.S. Patent Application No. 61/999,741, filed on Aug. 5, 2014, which is herein incorporated by reference in its entirety.

TECHNICAL FIELD

The present disclosure is related to electro-optic devices. More particularly, the present disclosure is related to optical couplers having anchored cantilever structure and fabrication thereof.

BACKGROUND

With the burgeoning growth of high-definition videos, cloud computing and mobile internet data usage, backbone network architectures supporting faster speed and larger traffic capacity are required to keep place with current needs and future-proof networks. Many 100 G coherent transmission systems have been widely utilized to update the long-haul network, and 400 G coherent transmission systems have been under field test by several service providers all over the world. Metro networks will likely follow the steps of long-haul network at a time delay of two to three years. However, a metro 100 G coherent transmission network is much more sensitive to the footprint, power consumption and cost of the coherent transceiver modules. Silicon photonics based on silicon-on-insulator (SOI) platforms are favored for high speed fiber communication applications due to its characteristics of CMOS process compatibility, low cost, low power consumption and ease of integration. With optical integration on SOI platform, it is possible to reduce cost by minimizing assembly touch points, mechanical adjustments, test apparatuses and the requirement of materials and separated devices.

Fiber coupling efficiency has been an important issue for integrated silicon photonics due to the small overlap between the mode of cleaved fiber and the mode of silicon nano-waveguides. Cantilever structures of silicon dioxide with silicon nitride inverse taper core waveguide have been proposed to achieve high coupling efficiency for transverse electric (TE)- and transverse magnetic (TM)-polarized input optical signal, where mode size converter is realized with the taper core waveguide. Still, TM-polarized optical coupling efficiency remains an unsolved issue when silicon is utilized as the inverse taper waveguide in thin silicon SOI platforms.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, an optical coupler structure may include a substrate, a waveguide section and an anchored cantilever section. The substrate may include a main body and a sub-pillar structure formed on the main body. The waveguide section may be disposed on the substrate, and may include a core waveguide of a first material surrounded by a cladding layer of a second material. The anchored cantilever section may be disposed on the sub-pillar structure on the substrate, which may be configured to support the cantilever section and separate the cantilever section from the main body of the substrate. The anchored cantilever section may include a multi-stage inverse taper core waveguide and a cladding layer, of the second material, which surrounds the multi-stage inverse taper core waveguide.

In another aspect, a fabrication method based on isotropic lateral dry etch technique to form an anchored cantilever structure may include a number of operations. The fabrication method may include: forming a waveguide core and silicon extended patterns on a top silicon layer of a silicon-on-insulator (SOI) substrate; forming an upper cladding layer over the waveguide core and the silicon extended patterns; forming a mask over the upper cladding layer, the mask defined by a pattern of a designed cantilever; removing an exposed portion of the cladding layer over the SOI substrate and the silicon extended patterns with a first dry etch process; forming silicon sub-pillars by a lateral dry etch process, during which the silicon extended patterns are removed; forming a cantilever structure with a second dry etch process to remove the silicon extended patterns on the cladding layer; and removing the mask.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

FIG. 1 is a schematic diagram of an optical coupler having an anchored cantilever structure with a multi-stage inverse taper core waveguide in accordance with an embodiment of the present disclosure.

DETAILED DESCRIPTION OF THE PREFERRED EMBODIMENTS

Figure 2A:
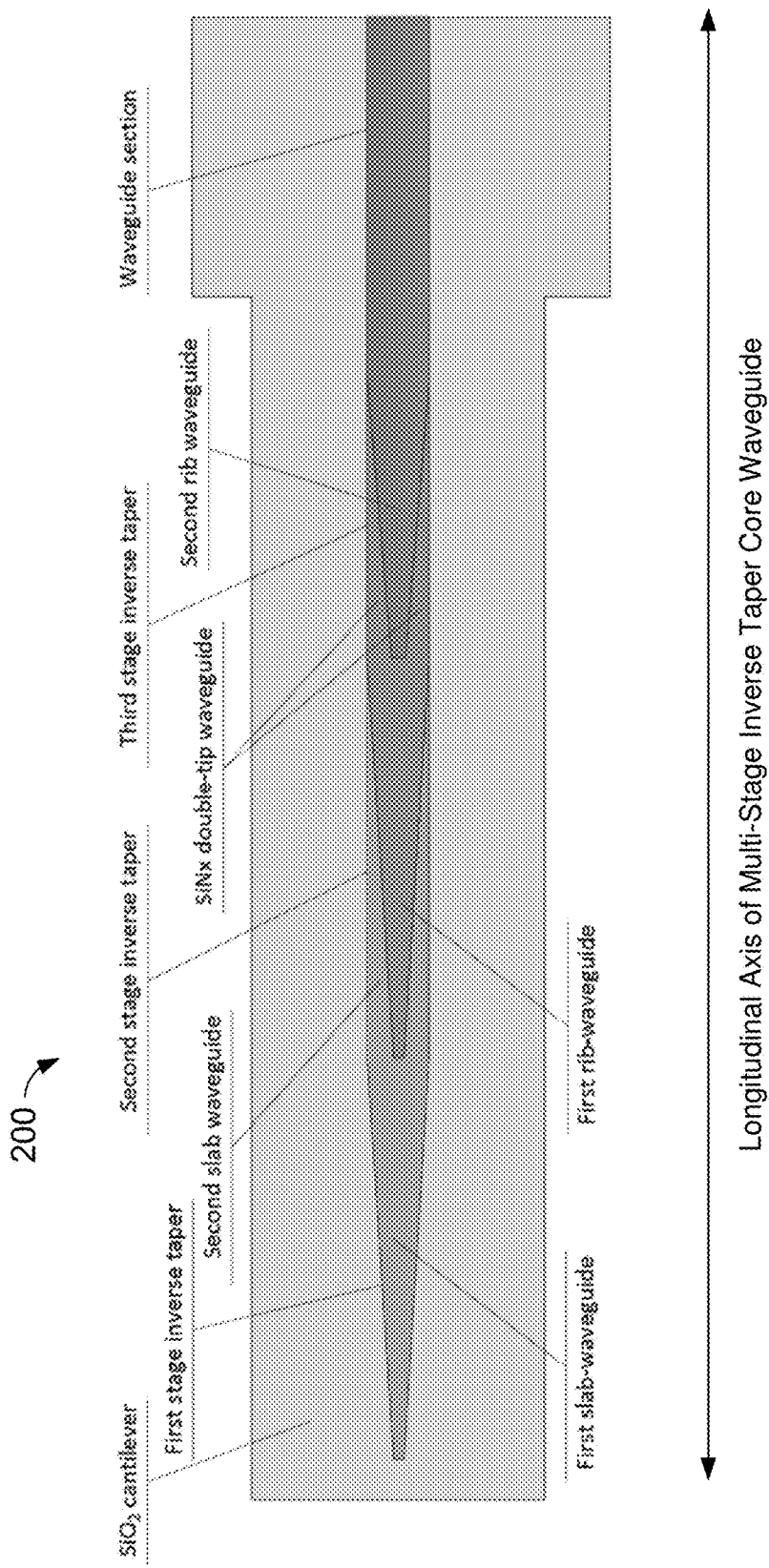
FIG. 2A is a top view of a three-stage inverse taper waveguide in accordance with an embodiment of the present disclosure.

The present disclosure provides various implementations of an optical coupler that includes an anchored cantilever structure with a multi-stage inverse taper core waveguide. Advantageously, an optical coupler in accordance with the present disclosure demonstrates high coupling efficiency for both TE- and TM-polarized optical signals from fiber ends.

FIG. 1 illustrates an optical coupler 100 having an anchored cantilever structure with a multi-stage inverse taper core waveguide in accordance with an embodiment of the present disclosure. Optical coupler 100 may be formed with a structure based on a substrate 110, which may be a silicon substrate or a silicon-on-insulator (SOI) substrate. Optical coupler 100 may include a waveguide section 150 formed on the oxide upper cladding layer 140. Optical coupler 100 may also include an anchored cantilever section 160. The waveguide section 150 and anchored cantilever section 160 together form a three-stage inverse taper core waveguide 170 supported by several silicon sub-pillars 120 formed on substrate 100, e.g., by lateral dry etch process. A major part of substrate 110 beneath anchored cantilever section 160 may be removed, e.g., by lateral dry etch process, and what remained during the removal process is the silicon sub-pillars 120. The silicon sub-pillars 120 are intentionally formed to function as a supporting structure of anchored cantilever section 160. The size of the silicon sub-pillars 120 are well controlled by extended pattern design and dry etch process, and the influence of silicon sub-pillars 120 on the waveguide mode and propagation loss is ignorable. Both the waveguide section 150 and the anchored cantilever section 160 include a silicon dioxide sub-cladding layer (e.g., including a buried oxide (BOX) layer 130, the core waveguide 170 and an upper cladding layer 140), which is a silicon dioxide layer formed by deposition. The core waveguide 170 in the waveguide section 150 may be a silicon channel-type waveguide, which confines both TE-mode and TM-mode within the core waveguide 170. The core waveguide 170 in the anchored cantilever section 160 is a three-stage inverse taper waveguide, including a first-stage inverse taper 172, a second-stage inverse taper 174 and a third-stage inverse taper 176.

Figure 2B:
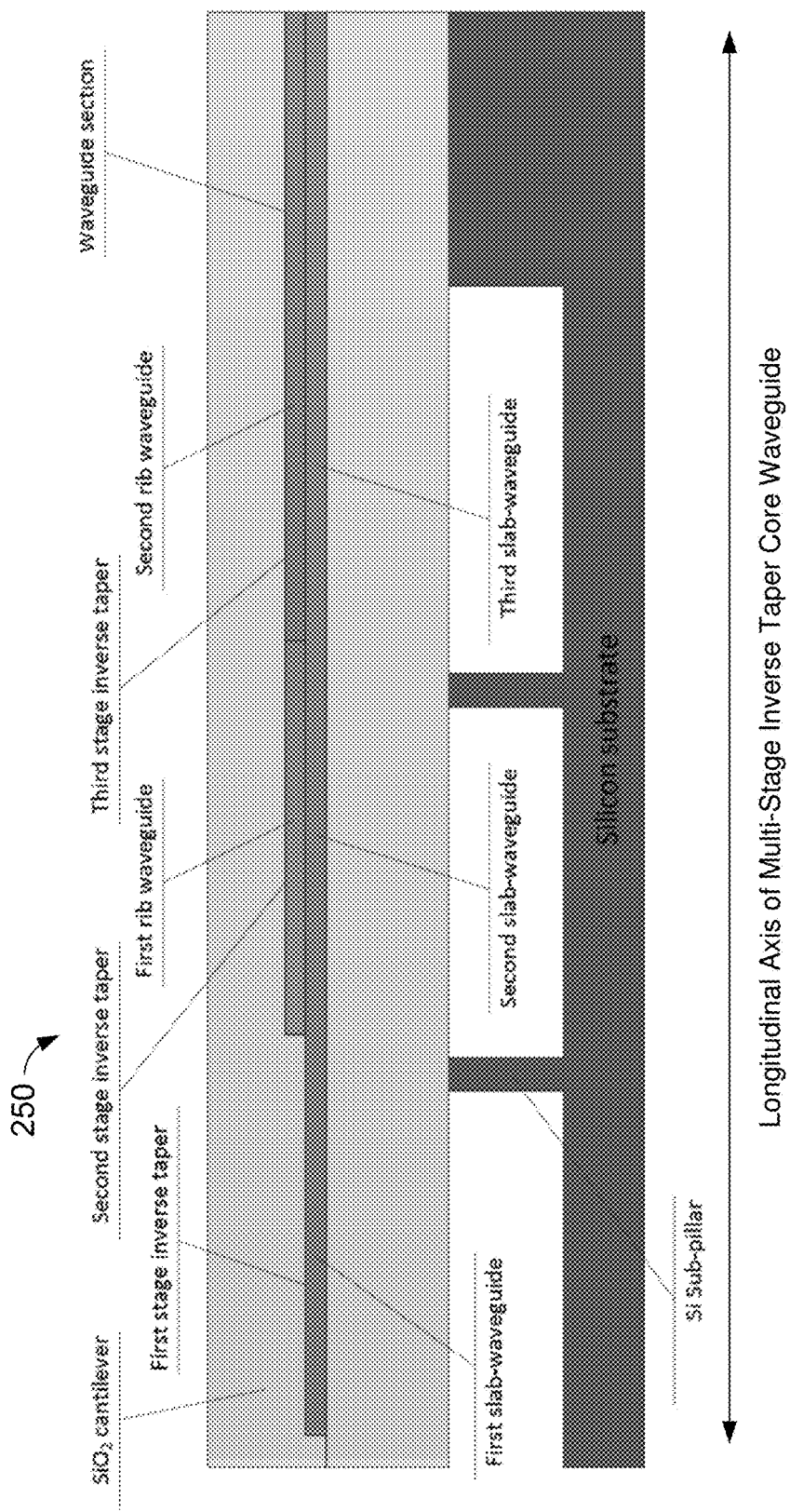
FIG. 2B is a cross-sectional view of an optical coupler having an anchored cantilever structure with a three-stage inverse taper waveguide in accordance with an embodiment of the present disclosure.

The width of the core waveguide 170 may be tapered from 500 nm down to a tiny tip end in order to expand the mode size, an example of which is illustrated in FIGS. 2A and 2B.

Figure 3:
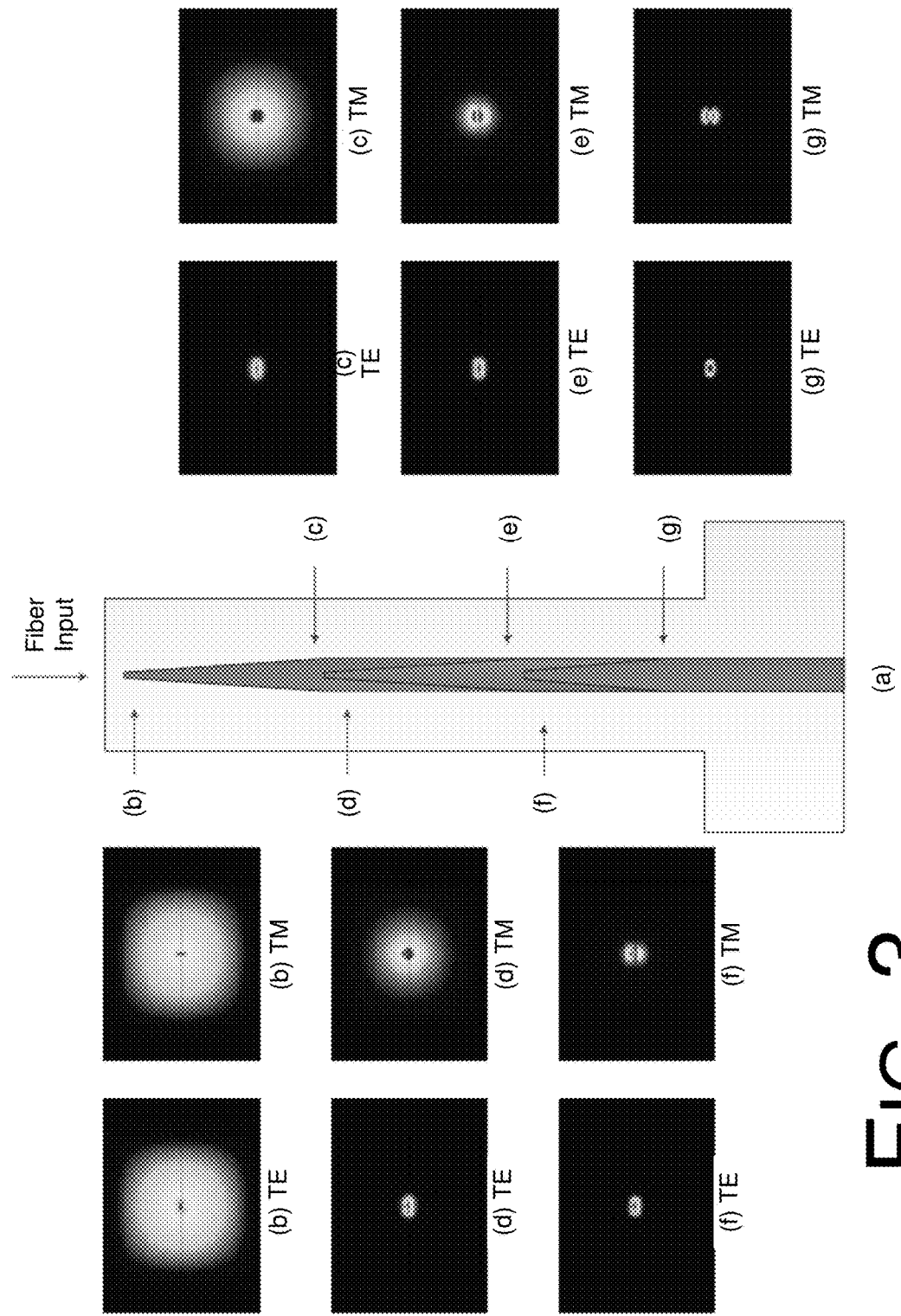
FIG. 3 is an illustration of mode conversion in an anchored cantilever with a three-stage inverse taper waveguide in accordance with an embodiment of the present disclosure.
Figure 4:
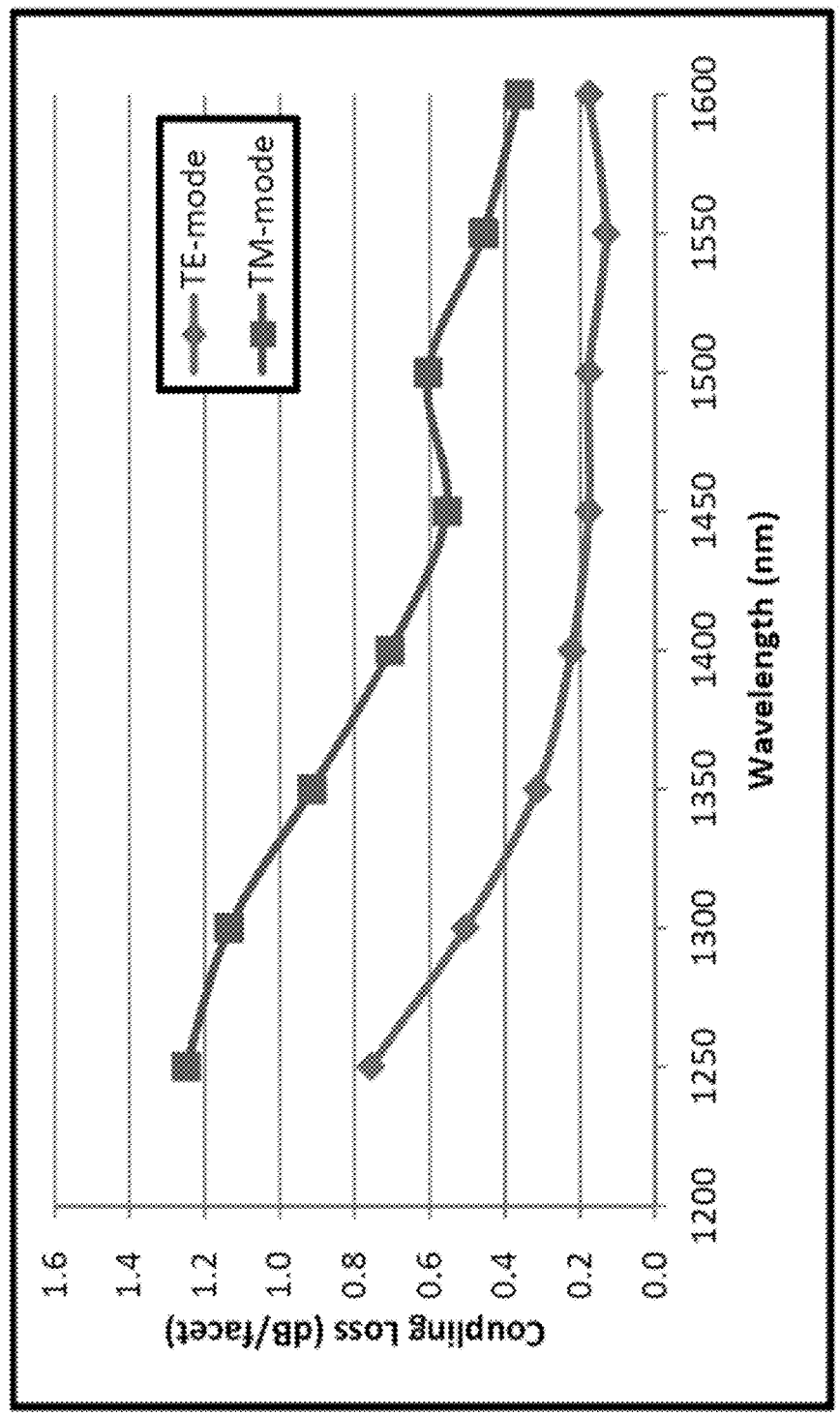
FIG. 4 is a chart of simulated coupling loss of TE- and TM-polarized mode from lensed fiber to an anchored cantilever structure, based on beam propagation method, in accordance with an embodiment of the present disclosure.

FIG. 2A illustrates a three-stage inverse taper waveguide 200 in accordance with an embodiment of the present disclosure. FIG. 2B illustrates an optical coupler 250 having an anchored cantilever structure with a three-stage inverse taper waveguide (e.g., three-stage inverse taper waveguide 200) in accordance with an embodiment of the present disclosure. FIG. 3 illustrates mode conversion in an anchored cantilever with a three-stage inverse taper waveguide in accordance with an embodiment of the present disclosure. FIG. 4 is a chart of simulated coupling loss of TE- and TM-polarized mode from lensed fiber to an anchored cantilever structure, based on beam propagation method, in accordance with an embodiment of the present disclosure.

Referring to FIG. 2A, the three-stage inverse taper waveguide 200 may include a first-stage inverse taper waveguide, a second-stage inverse taper waveguide and a third-stage inverse taper waveguide. The three-stage inverse taper waveguide 200 may be an example implementation of three-stage inverse taper core waveguide 170. The first-stage inverse taper waveguide may be fabricated on a silicon slab layer, with a thickness that is sufficiently thin to cut off TM mode in the silicon slab layer. As a result, both the tip width and tip height of the first-stage inverse taper waveguide may be small enough, and both TE mode and TM mode do not exist in the silicon tip core of the first-stage inverse taper waveguide. A silicon dioxide cladding layer may become the optical confining material for the optical field and may function as a waveguide. Accordingly, the mode size in both lateral and vertical directions are expanded to the size of the silicon dioxide cladding waveguide, thus matching the fiber mode, as illustrate in portion (b) of FIG. 3. Both TE- and TM-polarized signals are coupled into the cladding waveguide losslessly. The mode size of TE-mode is then gradually reduced due to the increasing width of slab waveguide as the light propagates along the waveguide, and finally TE mode is confined in the silicon slab waveguide in the first-stage, as shown portion (c) of FIG. 3. The second-stage inverse taper waveguide may include a silicon slab layer and a silicon nitride (SiNx) rib with inversely tapered width. SiNx material is adopted for the rib to realize smaller refractive index step in the vertical direction, since its refractive index is between that of $SiO_2$ and silicon. Thus, the mode mismatch is minimized as light propagates from the first-stage inverse taper waveguide into the second-stage inverse taper waveguide. The width of the SiNx rib may be tapered from 500 nm down to a tiny tip end in order to gradually change the effective index of the rib layer. This allows the gradual increase in the effective thickness of the core waveguide layer composed of silicon slab waveguide and SiNx rib waveguide, as well as the gradual decrease in the mode size of the TM-mode, as illustrated in portions (d) and (e) of FIG. 3. A typical width of the tip end may be within the range of 20 nm to 200 nm. TE-mode may also be gradually expanded from silicon slab waveguide into the upper SiNx rib waveguide. The third-stage inverse taper waveguide may include a silicon slab layer and an inversely tapered silicon-SiNx composite rib waveguide, including a silicon inverse taper rib waveguide and a SiNx double tip taper waveguide, as shown in Error! Reference source not found.A. The silicon-SiNx composite rib waveguide may be gradually changed from a SiNx material to a silicon material via a silicon inverse taper, with its width tapered from 500 nm to a tiny tip end. This allows the gradual increase in the effective index of the rib waveguide and decrease in the mode size of TM-polarized mode. Finally, TM-mode may be fully coupled from the cladding waveguide to the silicon nano-waveguide, as shown in portions (f) and (g) of FIG. 3.

FIG. 4 shows theoretical TE and TM coupling efficiencies from a lensed fiber with 5-µm spot size, based on beam propagation method (BPM) simulating the optical coupler structure including an anchored cantilever structure with a three-stage inverse taper waveguide (e.g., a structure similar to that shown in FIG. 1, FIG. 2A and/or FIG. 2B). Less than 0.5 dB coupling loss is achieved for both TE- and TM-polarized optical signals at 1550 nm. Excellent coupling efficiency of a cleaved fiber may be obtained when utilizing index matching fluid surrounding the anchored cantilever structure to further increase the mode size.

Figure 5:
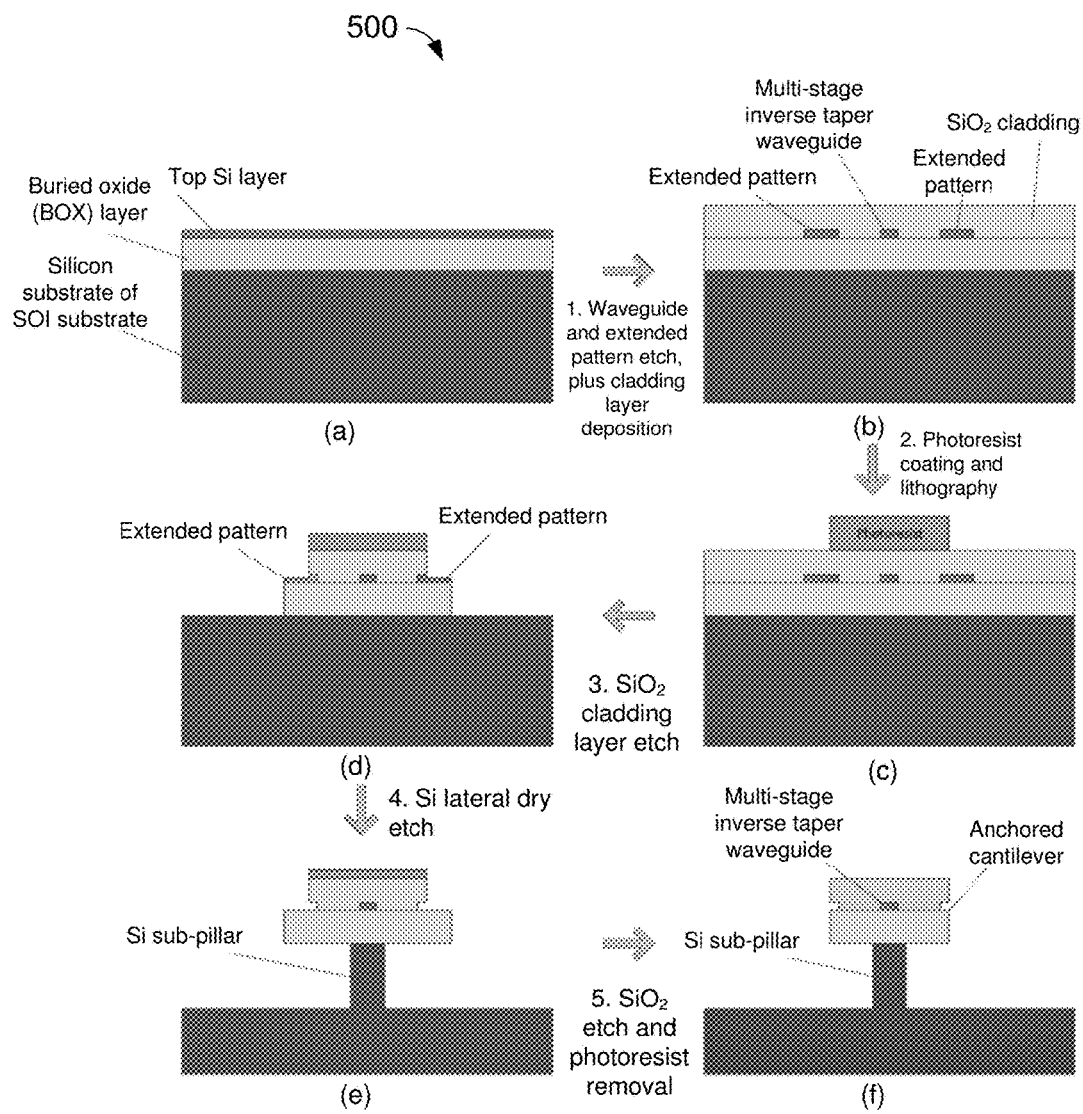
FIG. 5 is a diagram of a fabrication process of an anchored cantilever structure with central Si sub-pillars, based on symmetric extended patterns, in accordance with an embodiment of the present disclosure.
Figure 6:
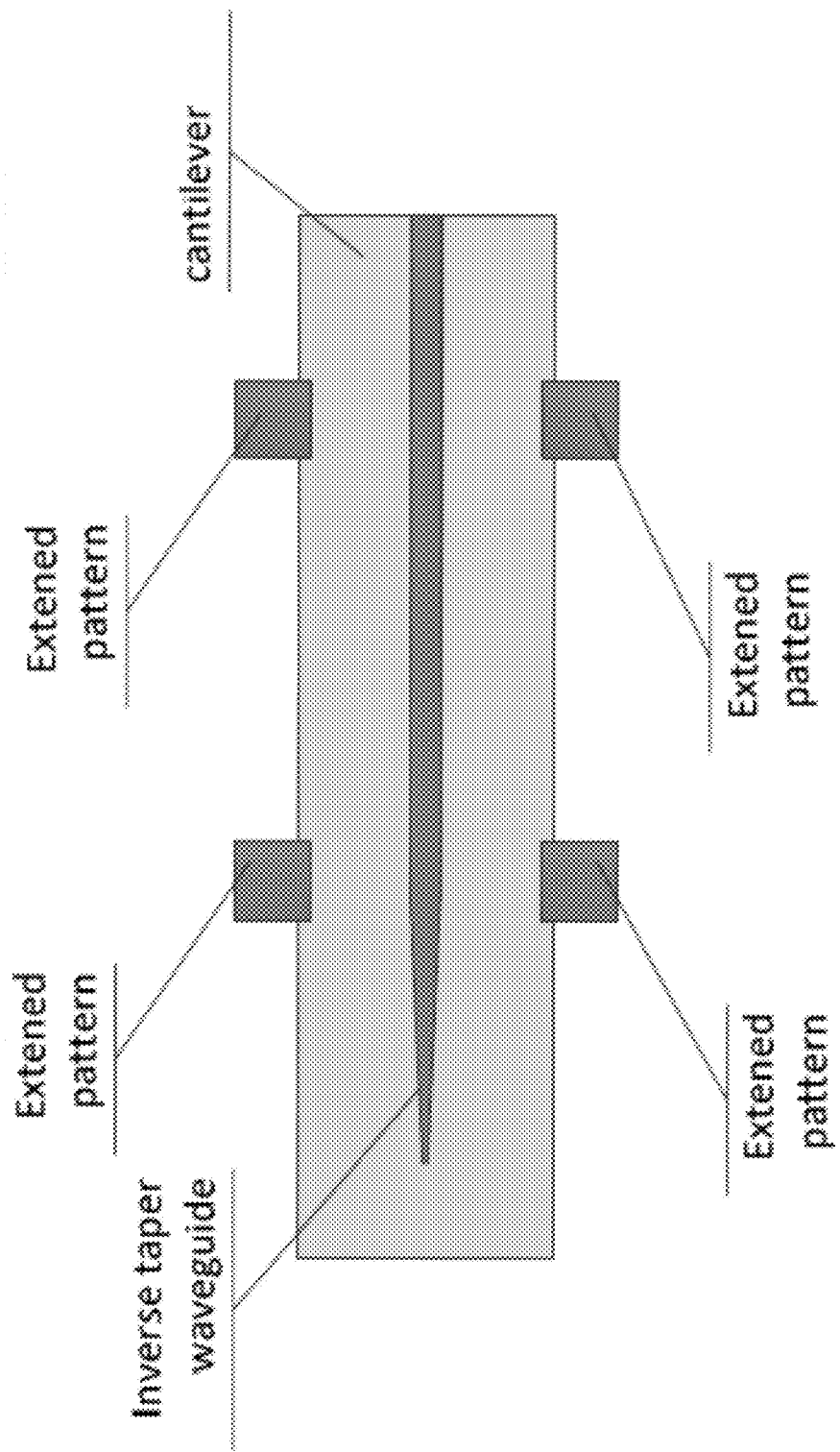
FIG. 6 is a top view of symmetric extended patterns before a deep trench dry etch process in accordance with an embodiment of the present disclosure.

FIG. 5 illustrates a fabrication process 500 of an anchored cantilever structure with central Si sub-pillars, based on symmetric extended patterns, in accordance with an embodiment of the present disclosure. FIG. 6 illustrates a top view of symmetric extended patterns before a deep trench dry etch process in accordance with an embodiment of the present disclosure.

Referring to FIG. 5, a silicon-on-insulator (SOI) substrate is provided, as shown in portion (a) of FIG. 5. Then, a multi-stage inverse taper waveguide is fabricated on the top silicon layer of the SOI substrate along with extended patterns, as shown in portion (b) of FIG. 5. The silicon extended patterns are symmetrically arranged along the side of the inverse taper waveguide and have a small overlap with designed cantilever structure, as shown in FIG. 6. After the deposition of upper cladding layer, photoresist is coated on the wafer, as shown in portion (c) of FIG. 5, and the cantilever pattern is defined by photolithography. A $SiO_2$ dry etch process is carried out to form the cladding waveguide of the cantilever. Since the dry etch process for $SiO_2$ has very high selectivity between silicon and $SiO_2$, the etch would stop at the silicon extended patterns and thus the oxide below silicon extended patterns are protected and un-etched, as shown in portion (d) of FIG. 5. The pattern of silicon extended pattern is transferred to a $SiO_2$ extended pattern on the BOX layer. Then, a lateral silicon dry etch process is carried out to separate cantilever from silicon substrate main body. The recipe for the lateral silicon dry etch is intentionally chosen to be isotropic, whereas the silicon beneath the cladding waveguide and $SiO_2$ extended pattern are etched isotropically. At the sections along the oxide cantilever with extended patterns, silicon beneath the cantilever remains more than that at other sections without extended patterns. By carefully controlling the lateral dry etch time, silicon sub-pillars are formed beneath the cantilever sections with extended pattern, as shown portion (e) of FIG. 5, while silicon substrate beneath the sections without extended pattern are fully etched away. During the silicon lateral dry etch process, the silicon extended patterns are also completely removed. Finally, the anchored cantilever structure is accomplished by a $SiO_2$ dry etch process and a photoresist mask removal process, as shown in portion (f) of FIG. 5.

Figure 7:
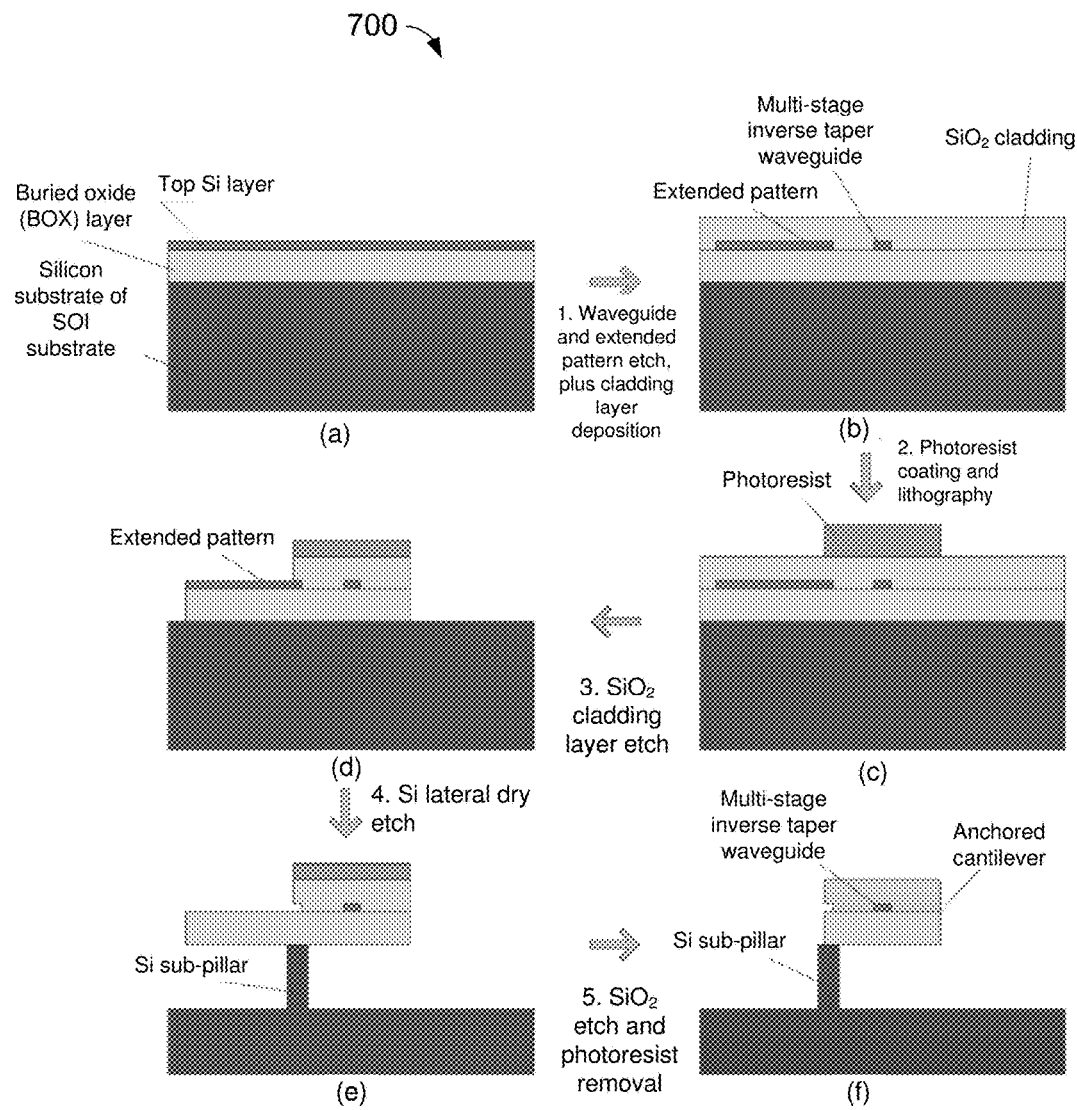
FIG. 7 is a diagram of a fabrication process of an anchored cantilever structure with side Si sub-pillars, based on asymmetric extended patterns, in accordance with an embodiment of the present disclosure.
Figure 8:
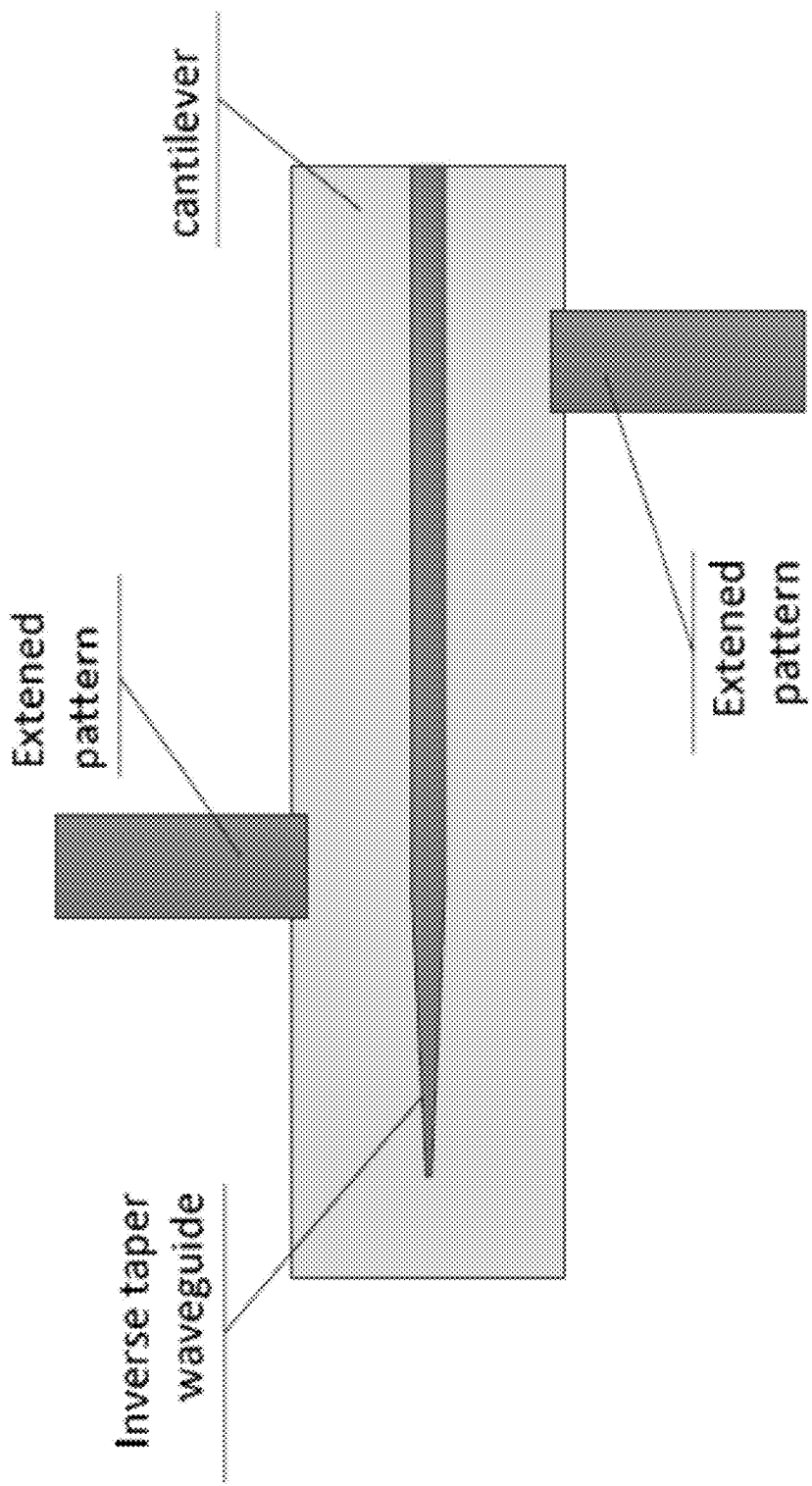
FIG. 8 is a top view of asymmetric extended patterns before a deep trench dry etch process in accordance with an embodiment of the present disclosure.

FIG. 7 illustrates a fabrication process 700 of an anchored cantilever structure with side Si sub-pillars, based on asymmetric extended patterns, in accordance with an embodiment of the present disclosure. FIG. 8 illustrates a top view of asymmetric extended patterns before a deep trench dry etch process in accordance with an embodiment of the present disclosure.

Referring to FIG. 7, a silicon-on-insulator (SOI) substrate is provided, as shown in portion (a) of FIG. 7. Then, a multi-stage inverse taper waveguide is fabricated on the top silicon layer of an SOI substrate, along with extended patterns, as shown in portion (b) of FIG. 7. The silicon extended patterns are asymmetrically arranged along the sides of inverse taper waveguide and have a small overlap with designed cantilever structure, as shown in Error! Reference source not found. The silicon extended pattern is designed to have a suitable width, thus to position the silicon sub-pillar to the sides beneath the cantilever. After the deposition of upper cladding layer, photoresist is coated on the wafer, as shown in portion (c) of FIG. 7, and the cantilever pattern is defined by photolithography. A $SiO_2$ dry etch process is carried out to form the cladding waveguide. Since the dry etch process for $SiO_2$ has very high selectivity between silicon and $SiO_2$, the etch would stop at the silicon extended patterns and thus the oxide below silicon extended patterns are protected and un-etched, as shown in portion (d) of FIG. 7. The pattern of silicon extended pattern is transferred to a $SiO_2$ extended pattern on the BOX layer. Then a lateral silicon dry etch process is carried out to separate cantilever from silicon substrate main body. The recipe for the lateral silicon dry etch is intentionally chosen to be isotropic, whereas the silicon beneath the cladding waveguide and $SiO_2$ extended pattern are etched isotropically. At the sections along the oxide cantilever with extended patterns, silicon beneath the cantilever remains more than that at other sections without extended patterns. By carefully controlling the lateral dry etch time, silicon sub-pillars are formed beneath cantilever sections with extended pattern, as shown in portion (e) of FIG. 7, while silicon substrate beneath the sections without extended pattern are fully etched away. During the silicon lateral dry etch process, the silicon extended patterns are also removed. Finally, the anchored cantilever structure is accomplished with $SiO_2$ extended patterns removed by a $SiO_2$ dry etch process and a photoresist mask removal process, as shown in portion (f) of FIG. 7.

Figure 9A:
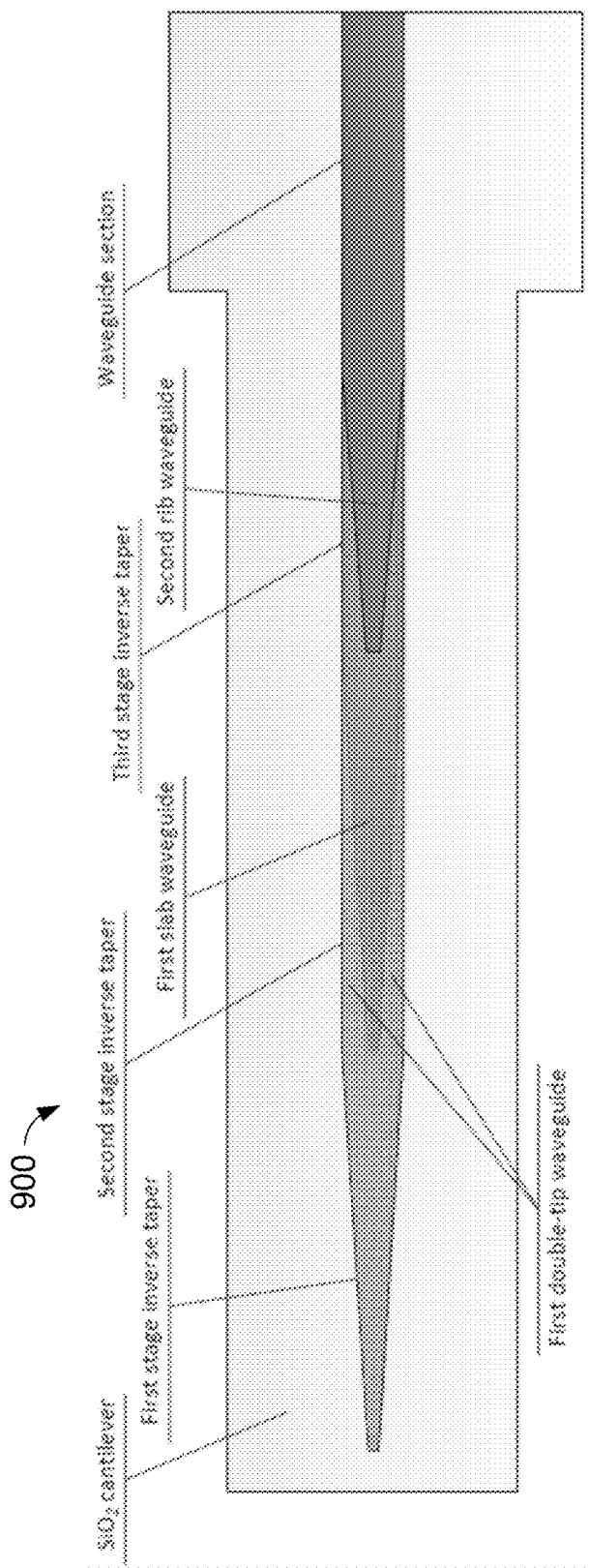
FIG. 9A is a schematic diagram of a three-stage SiNx-Si—Si inverse taper waveguide in accordance with an embodiment of the present disclosure.
Figure 9B:
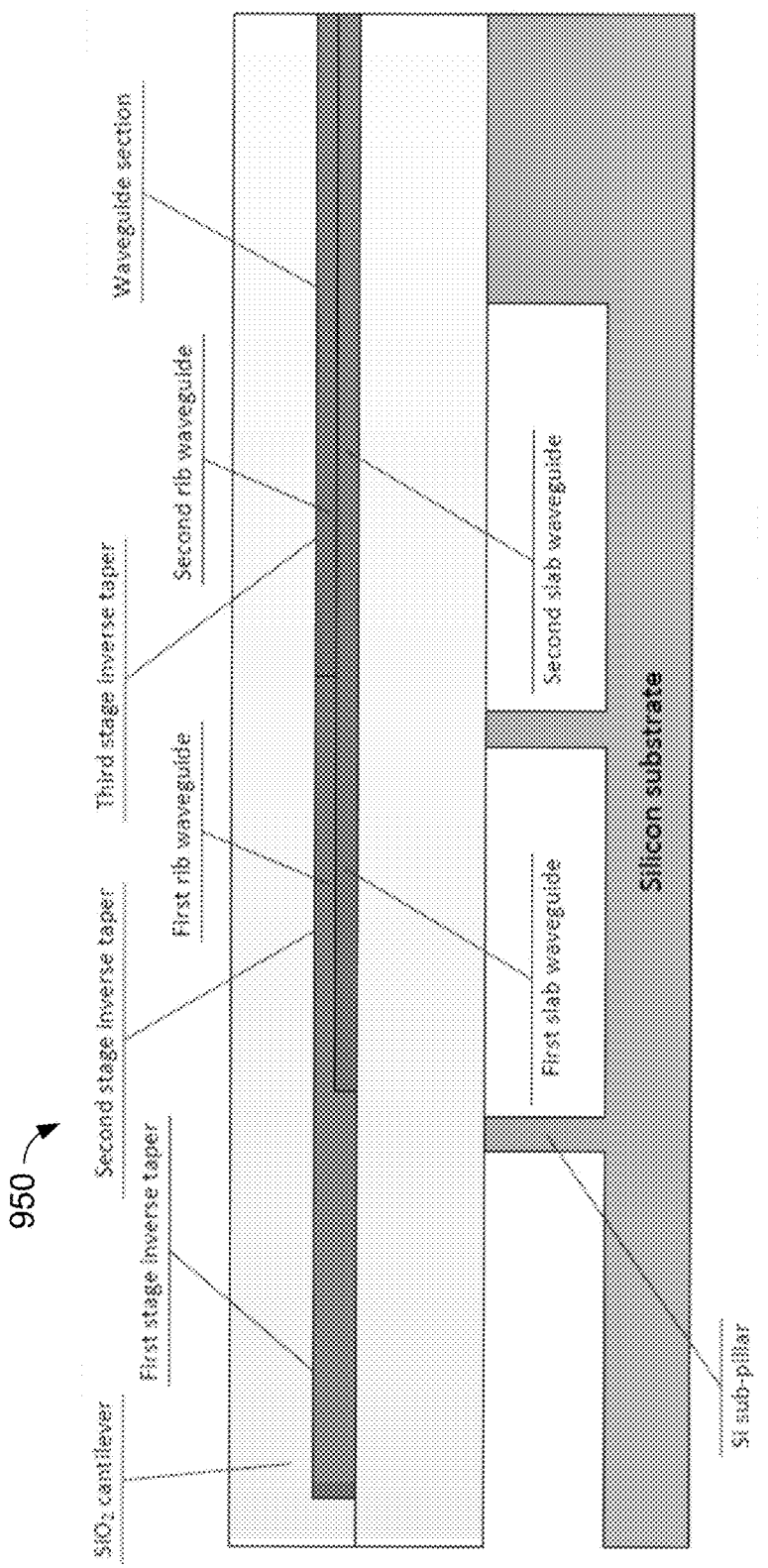
FIG. 9B is a cross-sectional view of an optical coupler having an anchored cantilever structure with a three-stage inverse taper waveguide in accordance with an embodiment of the present disclosure.

FIG. 9A illustrates a three-stage SiNx-Si—Si inverse taper waveguide 900 in accordance with an embodiment of the present disclosure. FIG. 9B illustrates a cross-sectional view of an optical coupler 950 having an anchored cantilever structure with a three-stage inverse taper waveguide (e.g., three-stage SiNx-Si—Si inverse taper waveguide 900) in accordance with an embodiment of the present disclosure.

Referring to FIGS. 9A and 9B, the first-stage inverse taper waveguide may be a SiNx waveguide. The second-stage inverse taper waveguide may include a silicon inverse taper waveguide formed on the silicon slab layer, a SiNx double tip taper slab waveguide, and a SiNx rib waveguide covering the silicon inverse taper waveguide. The third-stage inverse taper waveguide may include a silicon slab layer and an inversely tapered silicon-SiNx composite rib waveguide, including a silicon inverse taper rib waveguide and a SiNx double tip taper waveguide. The silicon-SiNx composite rib waveguide may gradually change from a SiNx material to a silicon material via a silicon inverse taper, with its width tapered from 500 nm to a tiny tip end. This allows the gradual increase in the effective index of the rib waveguide and decrease in the mode size of TM-polarized mode. Finally, TM-mode may be fully coupled from the cladding waveguide to the silicon nano-waveguide.

Figure 10A:
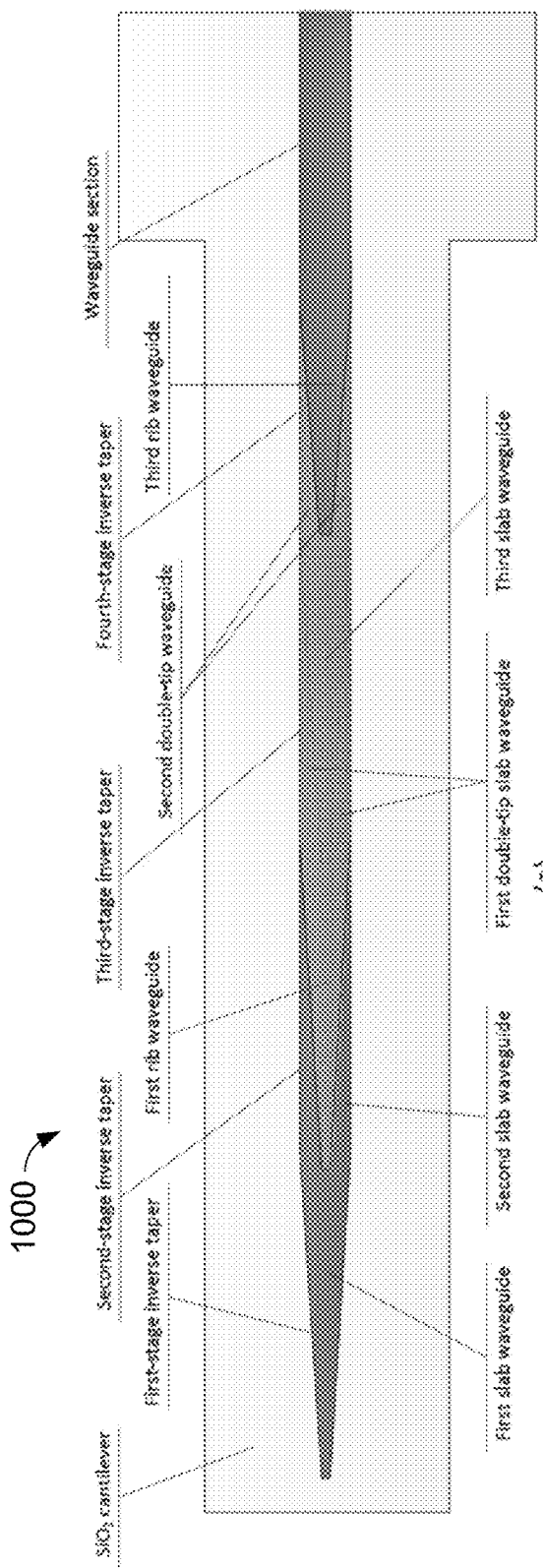
FIG. 10A is a schematic diagram of a four-stage SiNx-SiNx-Si—Si inverse taper waveguide in accordance with an embodiment of the present disclosure.
Figure 10B:
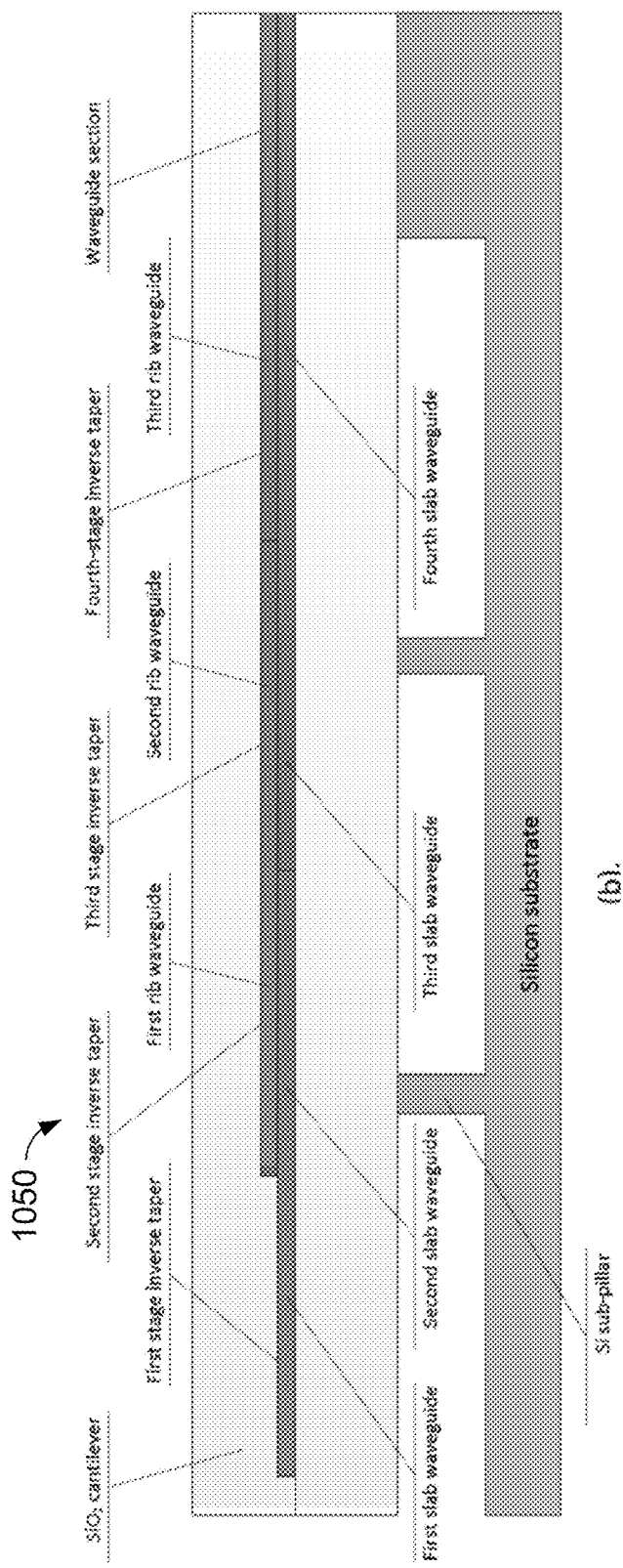
FIG. 10B is a cross-sectional view of an optical coupler having an anchored cantilever structure with a four-stage inverse taper waveguide in accordance with an embodiment of the present disclosure.

FIG. 10A illustrates a four-stage SiNx-SiNx-Si—Si inverse taper waveguide 1000 in accordance with an embodiment of the present disclosure. FIG. 10B illustrates a cross-sectional view of an optical coupler 1050 having an anchored cantilever structure with a four-stage inverse taper waveguide (e.g., four-stage SiNx-SiNx-Si—Si inverse taper waveguide 1000) in accordance with an embodiment of the present disclosure.

Referring to FIGS. 10A and 10B, the first-stage inverse taper waveguide may include a SiNx slab waveguide, which is designed to slightly reduce the mode size of the TE-mode and TM-mode. The second-stage inverse taper waveguide may include a SiNx slab waveguide and a SiNx rib waveguide with inversely tapered width disposed above the slab waveguide. The second-stage inverse taper waveguide is designed to further slightly reduce the size of TE-mode and TM-mode. The third-stage inverse taper waveguide may include a Si slab waveguide with inversely tapered width, a SiNx double tip slab waveguide with tapered width, and a silicon rib waveguide. The third-stage inverse taper waveguide is designed to reduce the TE-mode size and confine the TE-mode within the silicon slab waveguide. The fourth stage inverse taper waveguide may include a silicon slab layer and an inversely tapered silicon-SiNx composite rib waveguide, including a silicon inverse taper rib waveguide and a SiNx double tip taper waveguide. The silicon-SiNx composite rib waveguide may gradually change from a SiNx material to a silicon material via a silicon inverse taper, with its width tapered from 500 nm to a tiny tip end. This allows the gradual increase in the effective index of the rib waveguide and decrease in the mode size of TM-polarized mode. A typical width of the tip end is within a range of 20 nm to 200 nm. Finally, TM-mode may be fully coupled from the cladding waveguide to the silicon nano-waveguide.

Figure 11:
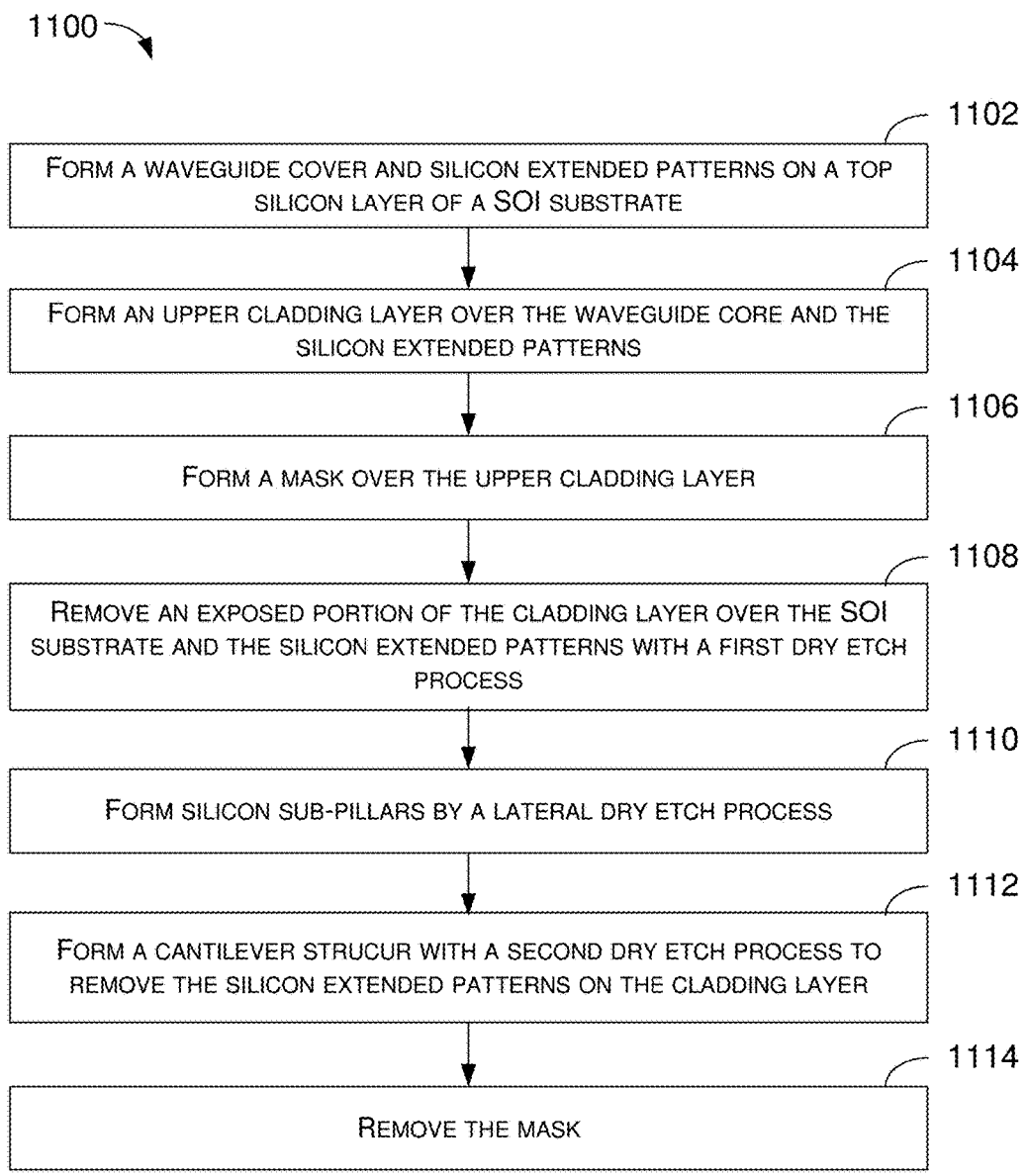
FIG. 11 is a flowchart of a fabrication process in accordance with an embodiment of the present disclosure.

FIG. 11 illustrates a fabrication process 1100 in accordance with an embodiment of the present disclosure. Fabrication process 1100 may include a number of operations which may be carried out sequentially or in parallel. Fabrication process 1100 may begin at 1102.

At 1102, fabrication process 1100 may form a waveguide core and silicon extended patterns on a top silicon layer of an SOI substrate.

At 1104, fabrication process 1100 may form an upper cladding layer over the waveguide core and the silicon extended patterns.

At 1106, fabrication process 1100 may form a mask over the upper cladding layer. The mask may be defined by a pattern of a designed cantilever.

At 1108, fabrication process 1100 may remove an exposed portion of the cladding layer over the SOI substrate and the silicon extended patterns with a first dry etch process.

At 1110, fabrication process 1100 may form silicon sub-pillars by a lateral dry etch process. During the lateral dry etch process, the silicon extended patterns may be removed.

At 1112, fabrication process 1100 may form a cantilever structure with a second dry etch process to remove the silicon extended patterns on the cladding layer.

At 1114, fabrication process 1100 may remove the mask.

In some implementations, a portion of the silicon extended patterns may overlap with the mask for defining the cantilever structure.

In some implementations, the silicon extended patterns may include symmetric patterns along the anchored cantilever structure. Alternatively, the silicon extended patterns may include asymmetric patterns along the anchored cantilever structure.

In some implementations, the mask may include a photoresist material.

Highlight of Features

In view of the above, select features of various implementations of the present disclosure are listed below.

In one aspect, an optical coupler structure may include a substrate, a waveguide section and an anchored cantilever section. The substrate may include a main body and a sub-pillar structure formed on the main body. The waveguide section may be disposed on the substrate, and may include a core waveguide of a first material surrounded by a cladding layer of a second material. The anchored cantilever section may be disposed on the sub-pillar structure on the substrate, which may be configured to support the cantilever section and separate the cantilever section from the main body of the substrate. The anchored cantilever section may include a multi-stage inverse taper core waveguide and a cladding layer, of the second material, which surrounds the multi-stage inverse taper core waveguide.

In some implementations, the multi-stage inverse taper core waveguide may have a gradually increasing effective refractive index along a propagation axis from the anchored cantilever section to the waveguide section.

In some implementations, a material of the multi-stage inverse taper core waveguide may include silicon dioxide, silicon nitride, silicon oxynitride, silicon, polysilicon, amorphous silicon, or a combination thereof.

In some implementations, the first material may include silicon.

In some implementations, the second material may include silicon dioxide.

In some implementations, the substrate may include a silicon substrate or a silicon-on-insulator (SOI) substrate.

In some implementations, the cladding layer of the anchored cantilever section may include a tapered cladding layer.

In some implementations, the multi-stage inverse taper core waveguide may include a three-stage inverse taper core waveguide, which may include: a first-stage inverse taper waveguide including a first slab waveguide with an inversely tapered width; a second-stage inverse taper waveguide including a second slab waveguide and a first rib waveguide with an inversely tapered width disposed on the second slab waveguide; and a third-stage inverse taper waveguide including a third slab waveguide, a second rib waveguide with an inversely tapered width, and a double tip waveguide with a tapered width. The second rib waveguide and the double tip waveguide may be disposed on the third slab waveguide.

In some implementations, a material of the first slab waveguide, the second slab waveguide and the third slab waveguide may include silicon.

In some implementations, a material of the first rib waveguide, the double tip waveguide, and the second rib waveguide may include silicon nitride, silicon oxynitride, or a combination of silicon dioxide, silicon nitride, silicon oxynitride, silicon, polysilicon, or amorphous silicon.

In some implementations, a material of the second rib waveguide may include silicon.

In some implementations, a pattern of the second rib waveguide and a pattern of the double tip waveguide may combine to shape a pattern of the third slab waveguide.

In some implementations, a width of a largest end portion of the second rib waveguide may at least approximately equal a width of an end portion of the third slab waveguide, which may form a channel-type waveguide and may be connected to the core waveguide of the waveguide section.

In some implementations, the multi-stage inverse taper core waveguide may include a three-stage inverse taper core waveguide, which may include: a first-stage inverse taper waveguide including a first waveguide with an inversely tapered width; a second-stage inverse taper waveguide including a first slab waveguide with an inversely tapered width, a first double tip slab waveguide, and a first rib waveguide disposed on the first slab waveguide and the first double tip slab waveguide; and a third-stage inverse taper waveguide including a second slab waveguide, a second rib waveguide with an inversely tapered width, and a second double tip waveguide with a tapered width. The second rib waveguide and the second double tip waveguide may be disposed on the second slab waveguide.

In some implementations, a material of the first slab waveguide, the second slab waveguide and the second rib waveguide may include silicon.

In some implementations, a material of the first waveguide, the first double tip slab waveguide and the second double tip waveguide may include silicon nitride, silicon oxynitride, or a combination of silicon dioxide, silicon nitride, silicon oxynitride, silicon, polysilicon, or amorphous silicon.

In some implementations, a pattern of the first slab waveguide and a pattern of the first double tip slab waveguide may combine to shape a pattern of the first rib waveguide.

In some implementations, a pattern of the second rib waveguide and a pattern of the second double tip waveguide may combine to shape a pattern of the second slab waveguide.

In some implementations, a width of a largest end portion of the second rib waveguide may at least approximately equal a width of an end portion of the second slab waveguide, which may form a channel-type waveguide and may be connected to the core waveguide of the waveguide section.

In some implementations, the multi-stage inverse taper core waveguide may include a four-stage inverse taper core waveguide, which may include: a first-stage inverse taper waveguide comprising a first slab waveguide with an inversely tapered width; a second-stage inverse taper waveguide comprising a second slab waveguide and a first rib waveguide with an inversely tapered width disposed on the second slab waveguide; a third-stage inverse taper waveguide comprising a third slab waveguide with an inversely tapered width, a first double tip slab waveguide with a tapered width, and a second rib waveguide; and a four stage inverse taper waveguide comprising a fourth slab waveguide, a third rib waveguide with a tapered width, and a second double tip waveguide. The third rib waveguide and the second double tip waveguide may be disposed on the fourth slab waveguide.

In some implementations, a material of the first slab waveguide, the second slab waveguide, the first rib waveguide, the first double tip slab waveguide and the second double tip waveguide may include silicon nitride, silicon oxynitride, or a combination of silicon dioxide, silicon nitride, silicon oxynitride, silicon, polysilicon, or amorphous silicon.

In some implementations, a material of the third slab waveguide, the fourth slab waveguide and the third rib waveguide may include silicon.

In some implementations, a pattern of the third slab waveguide and a pattern of the first double tip slab waveguide may combine to shape a pattern of the second rib waveguide.

In some implementations, a pattern of the third rib waveguide and a pattern of the second double tip waveguide may combine to shape a pattern of the second slab waveguide.

In some implementations, a width of a largest end portion of the third rib waveguide may at least approximately equal a width of an end portion of the fourth slab waveguide, which may form a channel-type waveguide and may be connected to the core waveguide of the waveguide section.

In some implementations, the anchored cantilever may be surrounded by an index matching fluid. The fluid may fill a gap between the anchored cantilever and the main body of the substrate and may cover a top surface and sidewall of the anchored cantilever.

In some implementations, the index matching fluid may include a fluid that is cured by a ultra-violet curing method.

In some implementations, a refractive index of the index matching fluid may be lower than a refractive index of the cladding layer.

In some implementations, an end portion of the anchored cantilever may be surrounded with a dielectric film.

In some implementations, the dielectric film may include an anti-reflection film.

In another aspect, a fabrication method based on isotropic lateral dry etch technique to form an anchored cantilever structure may include a number of operations. The fabrication method may include: forming a waveguide core and silicon extended patterns on a top silicon layer of a silicon-on-insulator (SOI) substrate; forming an upper cladding layer over the waveguide core and the silicon extended patterns; forming a mask over the upper cladding layer, the mask defined by a pattern of a designed cantilever; removing an exposed portion of the cladding layer over the SOI substrate and the silicon extended patterns with a first dry etch process; forming silicon sub-pillars by a lateral dry etch process, during which the silicon extended patterns are removed; forming a cantilever structure with a second dry etch process to remove the silicon extended patterns on the cladding layer; and removing the mask.

In some implementations, a portion of the silicon extended patterns may overlap with the mask for defining the cantilever structure.

In some implementations, the silicon extended patterns may include symmetric patterns along the anchored cantilever structure.

In some implementations, the silicon extended patterns may include asymmetric patterns along the anchored cantilever structure.

In some implementations, the mask may include a photoresist material.

Additional Notes

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. An optical coupler structure, comprising:
   a main body of a substrate;
   a waveguide section disposed on the main body of the substrate to be directly on top of and in contact with the main body of the substrate, the waveguide section comprising a core waveguide of a first material surrounded by a cladding layer of a second material;
   a cantilever section comprising:
      a multi-stage inverse taper core waveguide; and
      a cladding layer of the second material surrounding the multi-stage inverse taper core waveguide; and
   at least one sub-pillar structure formed on the main body of the substrate, the at least one sub-pillar structure configured to support the cantilever section and separate the cantilever section from the main body of the substrate,
wherein the cantilever section is disposed above the at least one sub-pillar structure such that the cantilever section and the at least one sub-pillar structure together form an anchored cantilever section, and
wherein at least a portion of the sub-pillar structure is directly beneath the multi-stage inverse taper core waveguide viewed in a cross-sectional view along a longitudinal axis of the multi-stage inverse taper core waveguide.

2. The optical coupler structure of claim 1, wherein the multi-stage inverse taper core waveguide has a gradually increasing effective refractive index along a propagation axis from the anchored cantilever section to the waveguide section.

3. The optical coupler structure of claim 1, wherein a material of the multi-stage inverse taper core waveguide comprises silicon nitride, silicon oxynitride, silicon, polysilicon, amorphous silicon, or a combination thereof.

4. The optical coupler structure of claim 1, wherein the first material comprises silicon.

5. The optical coupler structure of claim 1, wherein the second material comprises silicon dioxide.

6. The optical coupler structure of claim 1, wherein the substrate comprises a silicon substrate or a silicon-on-insulator (SOI) substrate.

7. The optical coupler structure of claim 1, wherein the cladding layer of the cantilever section comprises a tapered cladding layer.

8. The optical coupler structure of claim 1, wherein the multi-stage inverse taper core waveguide comprises a three-stage inverse taper core waveguide, comprising:
a first-stage inverse taper waveguide comprising a first slab waveguide with an inversely tapered width;
a second-stage inverse taper waveguide comprising a second slab waveguide and a first rib waveguide with an inversely tapered width disposed on the second slab waveguide; and
a third-stage inverse taper waveguide comprising a third slab waveguide, a second rib waveguide with an inversely tapered width, and a double tip waveguide with a tapered width, the second rib waveguide and the double tip waveguide disposed on the third slab waveguide.

9. The optical coupler structure of claim 8, wherein a material of the first slab waveguide, the second slab waveguide, the third slab waveguide, and the second rib waveguide comprises silicon.

10. The optical coupler structure of claim 8, wherein a material of the first rib waveguide and the double tip waveguide comprises silicon nitride, silicon oxynitride, or a combination of silicon dioxide, silicon nitride, silicon oxynitride, silicon, polysilicon, or amorphous silicon.

11. The optical coupler structure of claim 8, wherein a pattern of the second rib waveguide and a pattern of the double tip waveguide combine to shape a pattern of the third slab waveguide.

12. The optical coupler structure of claim 8, wherein a width of a largest end portion of the second rib waveguide at least approximately equals a width of an end portion of the third slab waveguide, which forms a channel-type waveguide and is connected to the core waveguide of the waveguide section.

13. The optical coupler structure of claim 1, wherein the multi-stage inverse taper core waveguide comprises a three-stage inverse taper core waveguide, comprising:
a first-stage inverse taper waveguide comprising a first waveguide with an inversely tapered width;
a second-stage inverse taper waveguide comprising a first slab waveguide with an inversely tapered width, a first double tip slab waveguide, and a first rib waveguide disposed on the first slab waveguide and the first double tip slab waveguide; and
a third-stage inverse taper waveguide comprising a second slab waveguide, a second rib waveguide with an inversely tapered width, and a second double tip waveguide with a tapered width, the second rib waveguide and the second double tip waveguide disposed on the second slab waveguide.

14. The optical coupler structure of claim 13, wherein a material of the first slab waveguide, the second slab waveguide and the second rib waveguide comprises silicon.

15. The optical coupler structure of claim 13, wherein a material of the first waveguide, the first double tip slab waveguide, the first rib waveguide, and the second double tip waveguide comprises silicon nitride, silicon oxynitride, or a combination of silicon dioxide, silicon nitride, silicon oxynitride, silicon, polysilicon, or amorphous silicon.

16. The optical coupler structure of claim 13, wherein a pattern of the first slab waveguide and a pattern of the first double tip slab waveguide combine to shape a pattern of the first rib waveguide.

17. The optical coupler structure of claim 13, wherein a pattern of the second rib waveguide and a pattern of the second double tip waveguide combine to shape a pattern of the second slab waveguide.

18. The optical coupler structure of claim 13, wherein a width of a largest end portion of the second rib waveguide at least approximately equals a width of an end portion of the second slab waveguide, which forms a channel-type waveguide and is connected to the core waveguide of the waveguide section.

19. The optical coupler structure of claim 1, wherein the multi-stage inverse taper core waveguide comprises a four-stage inverse taper core waveguide, comprising:
a first-stage inverse taper waveguide comprising a first slab waveguide with an inversely tapered width;
a second-stage inverse taper waveguide comprising a second slab waveguide and a first rib waveguide with an inversely tapered width disposed on the second slab waveguide;
a third-stage inverse taper waveguide comprising a third slab waveguide with an inversely tapered width, a first double tip slab waveguide with a tapered width, and a second rib waveguide; and
a fourth-stage inverse taper waveguide comprising a fourth slab waveguide, a third rib waveguide with a tapered width, and a second double tip waveguide, the third rib waveguide and the second double tip waveguide disposed on the fourth slab waveguide.

20. The optical coupler structure of claim 19, wherein a material of the first slab waveguide, the second slab waveguide, the first rib waveguide, the first double tip slab waveguide and the second double tip waveguide comprises silicon nitride, silicon oxynitride, or a combination of silicon dioxide, silicon nitride, silicon oxynitride, silicon, polysilicon, or amorphous silicon.

21. The optical coupler structure of claim 19, wherein a material of the third slab waveguide, the fourth slab waveguide and the third rib waveguide comprises silicon.

22. The optical coupler structure of claim 19, wherein a pattern of the third slab waveguide and a pattern of the first double tip slab waveguide combine to shape a pattern of the second rib waveguide.

23. The optical coupler structure of claim 19, wherein a pattern of the third rib waveguide and a pattern of the second double tip waveguide combine to shape a pattern of the second slab waveguide.

24. The optical coupler structure of claim 19, wherein a width of a largest end portion of the third rib waveguide at least approximately equals a width of an end portion of the fourth slab waveguide, which forms a channel-type waveguide and is connected to the core waveguide of the waveguide section.

25. The optical coupler structure of claim 1, wherein the anchored cantilever is surrounded by an index matching fluid, the fluid filling a gap between the anchored cantilever and the main body of the substrate and covering a top surface and sidewall of the anchored cantilever.

26. The optical coupler structure of claim 25, wherein the index matching fluid comprises a fluid that is cured by a ultra-violet curing method.

27. The optical coupler structure of claim 25, wherein a refractive index of the index matching fluid is lower than a refractive index of the cladding layer.

28. The optical coupler structure of claim 1, wherein an end portion of the anchored cantilever is surrounded with a dielectric film.

* * * * *